(12) United States Patent   (10) Patent No.: US 12,663,270 B2
Naidu et al.   (45) Date of Patent: Jun. 23, 2026

(54) SYSTEMS AND METHODS OF LIFT TO FIND AUGMENTED REALITY GUIDANCE

(71) Applicant: Walmart Apollo, LLC, Bentonville, AR (US)

(72) Inventors: Navin Naidu, Dublin, CA (US); Shankara Bhargava, Santa Clara, CA (US); Deepa Mohan, Los Altos, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 189 days.

(21) Appl. No.: 18/423,851

(22) Filed: Jan. 26, 2024

(65) Prior Publication Data

US 2024/0255285 A1 Aug. 1, 2024

Related U.S. Application Data

(60) Provisional application No. 63/442,367, filed on Jan. 31, 2023.

(51) Int. Cl.
G06Q 30/0601 (2023.01)
G01C 21/20 (2006.01)
(Continued)

(52) U.S. Cl.
CPC ....... G01C 21/206 (2013.01); G06Q 30/0639 (2013.01); G06Q 30/06443 (2025.08);
(Continued)

(58) Field of Classification Search
CPC .. G06Q 30/0639; G06V 20/20; G01C 21/206; G06T 2207/30204; G06T 2200/24; G06T 7/73; G06T 11/00
See application file for complete search history.

(56) References Cited

U.S. PATENT DOCUMENTS 7,231,380 B1 * 6/2007 Pienkos ............. G06Q 30/0639
705/28
7,309,009 B2 * 12/2007 Singer-Harter ........ G06Q 30/02
235/383
(Continued)

OTHER PUBLICATIONS

R. Pietrini et al., "Shelf Management: A deep learning-based system for shelf visual monitoring," Expert Systems With Applications, 255 (Year: 2024) 14 pages.

(Continued)

*Primary Examiner* — Dino Kujundzic
(74) *Attorney, Agent, or Firm* — Fitch, Even, Tabin & Flannery LLP

(57) ABSTRACT

In various embodiments, systems and methods for augmented reality guidance are disclosed. A first position of a local device and a second position of a first item within a predetermined locale are determined. Route data from the first position to the second position is generated and a position of the local device is tracked. In response to the position of the local device being within a predetermined distance of the second position, an image capture element of the local device is activated. Image data is received. When the first item is within the image data, an item highlighter indicating a position of the first item within the image data is generated and when the first item is not within the image data, a direction indicator indicating a position of the first item relative to a field of view of the image data is generated.

20 Claims, 7 Drawing Sheets

(51) Int. Cl.

| | |
|---|---|
| *G06T 7/73* | (2017.01) |
| *G06T 11/00* | (2006.01) |
| *G06V 20/20* | (2022.01) |

(52) U.S. Cl.
CPC ................ *G06T 7/73* (2017.01); *G06T 11/00* (2013.01); *G06V 20/20* (2022.01); *G06Q 30/0641* (2013.01); *G06T 2200/24* (2013.01); *G06T 2207/30204* (2013.01)

(56) References Cited

U.S. PATENT DOCUMENTS

| | | | | |
|---|---|---|---|---|
| 7,707,073 | B2 * | 4/2010 | Bloebaum | G06Q 30/0633 705/26.8 |
| 2005/0256782 | A1 * | 11/2005 | Sands | G06Q 10/087 705/26.8 |
| 2009/0012704 | A1 * | 1/2009 | Franco | G01C 21/20 707/E17.014 |
| 2009/0182499 | A1 * | 7/2009 | Bravo | G01C 21/20 701/408 |
| 2012/0062596 | A1 * | 3/2012 | Bedi | G06Q 30/0267 345/633 |
| 2013/0085345 | A1 * | 4/2013 | Geisner | G06Q 30/00 600/300 |
| 2014/0207615 | A1 * | 7/2014 | Li | G06Q 30/0623 705/26.61 |
| 2014/0214600 | A1 * | 7/2014 | Argue | G06Q 30/0639 705/26.8 |
| 2019/0278993 | A1 * | 9/2019 | Hoover | H04L 67/306 |
| 2020/0302510 | A1 * | 9/2020 | Chachek | G06V 20/52 |
| 2021/0124952 | A1 * | 4/2021 | Mirza | G06T 7/73 |
| 2021/0374836 | A1 * | 12/2021 | Bronicki | G06Q 30/0208 |
| 2023/0035270 | A1 | 2/2023 | Kaufman | |
| 2023/0196764 | A1 * | 6/2023 | Wisnewski | G06V 10/25 382/103 |
| 2024/0144354 | A1 * | 5/2024 | Glaser | G06Q 10/087 |
| 2024/0255285 | A1 | 8/2024 | Naidu et al. | |

OTHER PUBLICATIONS

Asseco Business Solutions, "Image Recognition—Sales Support Asseco Business Solutions," https://wsparcie-sprzedazy.assecobs.pl/rozwiazania/image-recognition/, (Year: 2023), 19 pages.

* cited by examiner

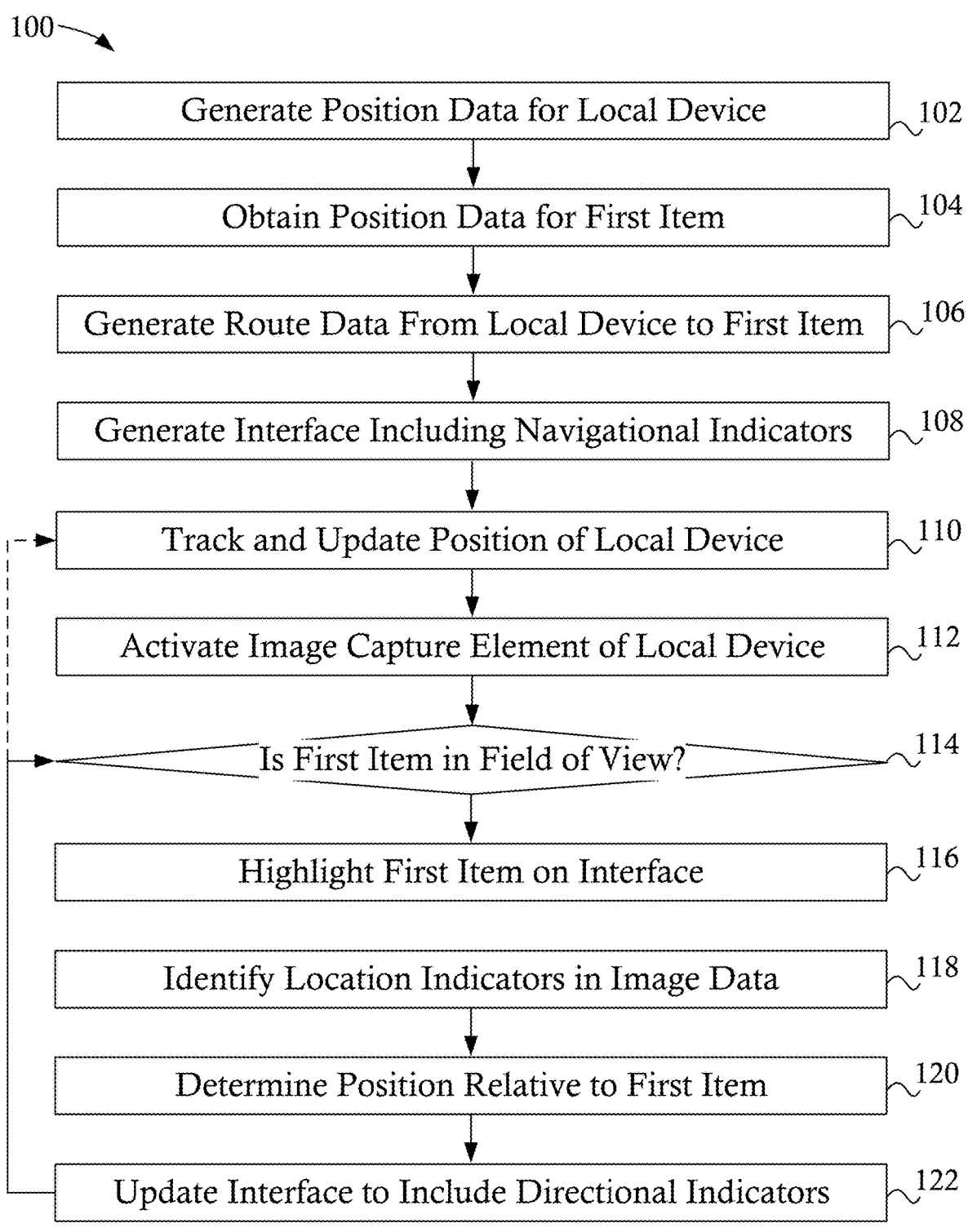

100

Generate Position Data for Local Device    102

Obtain Position Data for First Item    104

Generate Route Data From Local Device to First Item    106

Generate Interface Including Navigational Indicators    108

Track and Update Position of Local Device    110

Activate Image Capture Element of Local Device    112

Is First Item in Field of View?    114

Highlight First Item on Interface    116

Identify Location Indicators in Image Data    118

Determine Position Relative to First Item    120

Update Interface to Include Directional Indicators    122

FIG. 3

SYSTEMS AND METHODS OF LIFT TO FIND AUGMENTED REALITY GUIDANCE

CROSS-REFERENCE TO RELATED APPLICATIONS

This application claims benefit to U.S. Provisional Appl. No. 63/442,367, filed 31 Jan. 2023, entitled System and Method of Lift to Find Augmented Reality Guidance, the disclosure of which is incorporated herein by reference in its entirety.

TECHNICAL FIELD

This application relates generally to augmented reality, and more particularly, to navigation of real spaces using augmented reality guidance.

BACKGROUND

Physical environments open to the public, such as retail environments, can include visual aids for navigation. For example, a retail environment can include labeling, such as aisle and/or bay labeling, that assists customers in navigating the physical environment when looking for specific items or locations. However, navigational aids are useful only when a customer knows the location within the store of a desired item, e.g., knowing the aisle and/or bay of a desired item.

Even when the general location of an item is known, for example the aisle and bay, locating the desired item can be difficult. Different items, such as brands, types, sizes, etc., can have similar labeling, making location and identification of single items difficult. In addition, item locations within a shelving unit, aisle, and/or other display element can change based on various factors, such as seasonal stocking, new products being introduced, products being discontinued, etc. These variations can make it difficult to find items even on repeat visits.

SUMMARY

In various embodiments, a system is disclosed. The system includes a non-transitory memory and a processor communicatively coupled to the non-transitory memory. The processor is configured to read a set of instructions to determine a first position of a local device within a predetermined locale, determine a second position of a first item within the predetermined locale, generate route data indicative of a route from the first position to the second position, and track a real-time position of the local device. In response to the real-time position of the local device being within a predetermined distance of the second position, an image capture element of the local device is activated. The processor is further configured to receive image data from the image capture element of the local device and determine whether the first item is within the image data. In response to determining the first item is within the image data, the processor generates an item highlighter indicating a position of the first item within the image data and, in response to determining the first item is not within the image data, the processor generates a direction indicator indicating a position of the first item relative to a field of view of the image data.

In various embodiments, a system is disclosed. The system includes a non-transitory memory, a position determination unit configured to determine a real-time position within a predetermined locale, an image capture element, and a processor communicatively coupled to the non-transitory memory. The processor is configured to read a set of instructions to obtain a second position of a first item within the predetermined locale, generate route data indicative of a route from the real-time position to the second position, activate the image capture element in response to the real-time position being within a predetermined distance of the second position, receive image data from the image capture element, determine whether the first item is within the image data, generate an item highlighter indicating a position of the first item within the image data in response to determining the first item is within the image data, and generate a direction indicator indicating a position of the first item relative to a field of view of the image data in response to determining the first item is not within the image data.

In various embodiments, a computer-implemented method is disclosed. The method includes the steps of determining, by a position tracking engine, a first position of a local device within a predetermined locale, obtaining a second position of a first item within the predetermined locale, generating, by a mapping engine, route data indicative of a route from the first position to the second position, tracking, by the position tracking engine, a real-time position of the local device, activating an image capture element of the local device in response to the real-time position of the local device being within a predetermined distance of the second position, receiving, by a computer vision engine, image data from the image capture element of the local device, determining, by the computer vision engine, whether the first item is within the image data, generating, by an interface generation engine, an item highlighter indicating a position of the first item within the image data in response to determining the first item is within the image data, and generating, by the interface generation engine, a direction indicator indicating a position of the first item relative to a field of view of the image data in response to determining the first item is not within the image data.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein:

FIG. 3 is a flowchart illustrating a method of lift-to-find augmented reality guidance, in accordance with some embodiments;

DETAILED DESCRIPTION

Figure 1:
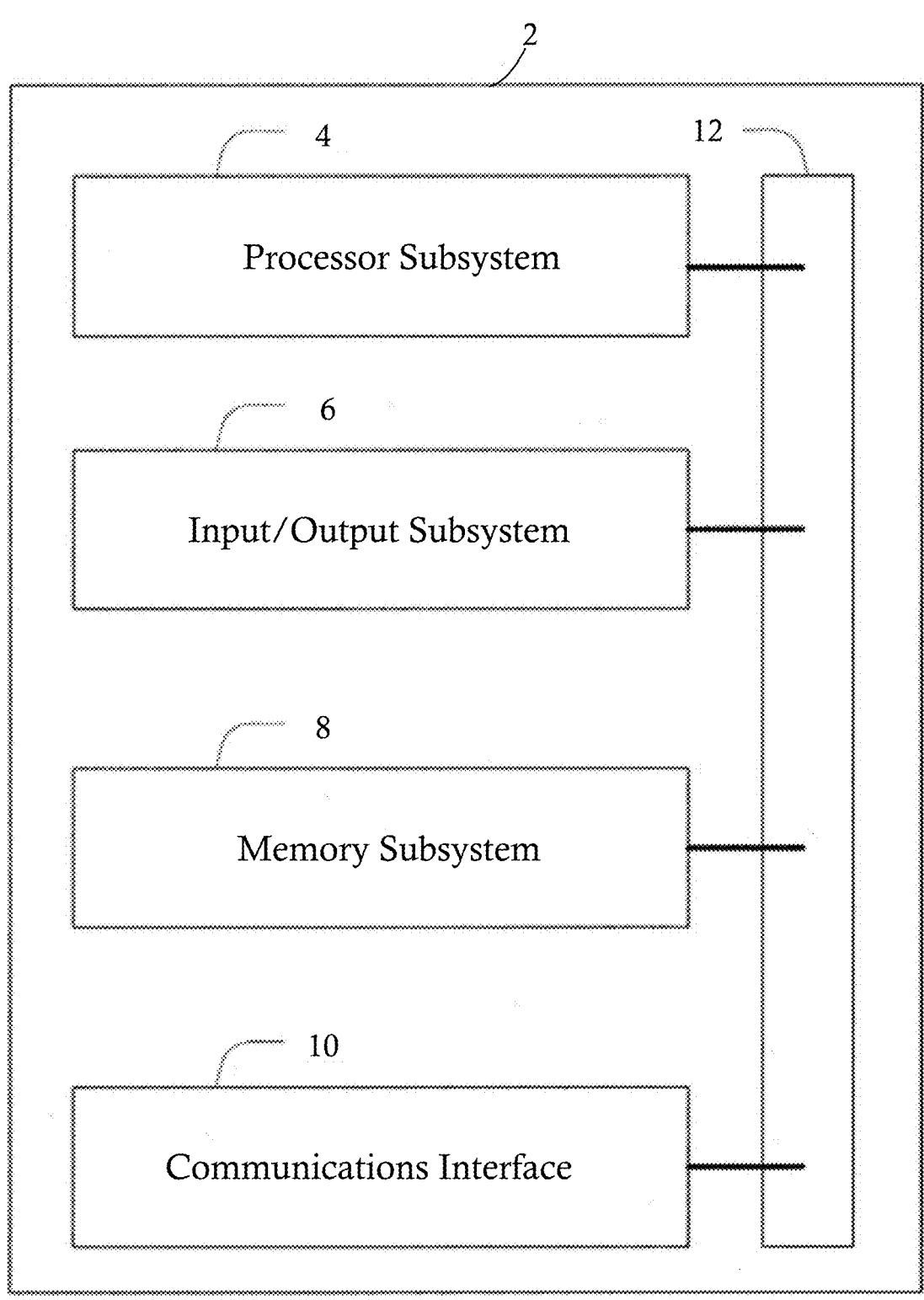
FIG. 1 illustrates a computer system configured to implement one or more processes, in accordance with some embodiments.

This description of the exemplary embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for lift to find augmented reality guidance. A local device is configured to generate local location data corresponding to a location of the device within a defined area. For example, in some embodiments, the local device is configured to generate local location data corresponding to a position of the local device within a retail store, warehouse, etc. The local device is configured to generate a user interface including guidance, such as visual and/or auditory guidance, indicating a route from a current position to a position of an item of interest. When the local device determines it is within a predetermined proximity of the item of interest, the local device begins collecting image input, for example, via a camera integrated with the local device. A computer vision module is configured to provide item recognition within the image input and generate an interface including the image input and an indicator corresponding to a location of the item of interest. The indicator can include guidance indicators, such as arrows, and/or item indicators, such as a drawn element identifying the position of an item of interest.

In some embodiments, a method for lift-to-find augmented reality guidance is configured to provide augmented reality guidance of a user within a predetermined locale, such as a retail store. For example, a user enters a predetermined locale, such as a retail store, and activates a local application on a local device, such as the user's mobile phone or other device. The local application corresponds to the operator of the retail store. A user can interact with the local device, such as via a user interface, to identify one or more items of interest. After selecting at least first item, the interface of the local device is updated to provide navigational indications to guide a user from the current position of the local device to a position of the first item. When the user device is brought within a predetermined range of the position of the first item (e.g., a user carries the device while following the navigational indications), an image capture element, such as a camera, included in the local device is automatically activated. The image data captured by the camera is analyzed to determine if the first item is in the field of view of the camera. If the first item is in the field of view, a position of the first item is highlighted on the interface to assist a user in finding the first item. If the first item is not in the field of view, directional indicators, such as arrows, guide a user from the current field of view to a field of view that includes the first item. Once the local device is positioned to include the first item in the field of view, the first item is highlighted to guide a user to the exact position. Additional items can subsequently be selected and guidance can be provided to each of the additional items.

In various embodiments, a system includes a local device and a backend device. The backend device is configured to provide one or more backend operations, such as, for example, mapping tasks, computer vision tasks, and/or other backend processing tasks. The local device is configured to generate local location information for the device and, intermittently, collect live image data for computer vision processing. In some embodiments, one or more operations identified as being performed on a backend device can be performed on the local device.

In some embodiments, systems, and methods for lift-to-find augmented reality guidance includes a trained computer vision model configured to identify items, products, and/or other elements within an image input.

FIG. 1 illustrates a computer system configured to implement one or more processes, in accordance with some embodiments. The system 2 is a representative device and can include a processor subsystem 4, an input/output subsystem 6, a memory subsystem 8, a communications interface 10, and a system bus 12. In some embodiments, one or more than one of the system 2 components can be combined or omitted such as, for example, not including an input/output subsystem 6. In some embodiments, the system 2 can include other components not combined or comprised in those shown in FIG. 1. For example, the system 2 can also include, for example, a power subsystem. In other embodiments, the system 2 can include several instances of the components shown in FIG. 1. For example, the system 2 can include multiple memory subsystems 8. For the sake of conciseness and clarity, and not limitation, one of each of the components is shown in FIG. 1.

The processor subsystem 4 can include any processing circuitry operative to control the operations and performance of the system 2. In various aspects, the processor subsystem 4 can be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also can be implemented by a controller, a microcontroller, an application specific integrated circuit (ASIC), a field programmable gate array (FPGA), a programmable logic device (PLD), and so forth.

In various aspects, the processor subsystem 4 can be arranged to run an operating system (OS) and various applications. Examples of an OS comprise, for example, operating systems generally known under the trade name of Apple OS, Microsoft Windows OS, Android OS, Linux OS, and any other proprietary or open-source OS. Examples of applications comprise, for example, network applications, local applications, data input/output applications, user interaction applications, etc.

In some embodiments, the system 2 can include a system bus 12 that couples various system components including the processor subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCM-CIA), Small Computers Interface (SCSI) or other proprietary bus, or any custom bus suitable for computing device applications.

In some embodiments, the input/output subsystem 6 can include any suitable mechanism or component to enable a user to provide input to system 2 and the system 2 to provide output to the user. For example, the input/output subsystem 6 can include any suitable input mechanism, including but not limited to, a button, keypad, keyboard, click wheel, touch screen, motion sensor, microphone, camera, etc. In some embodiments, the input/output subsystem 6 includes at least one image capture device configured to obtain real-time image data.

In some embodiments, the input/output subsystem 6 can include a visual peripheral output device for providing a display visible to the user. For example, the visual peripheral output device can include a screen such as, for example, a Liquid Crystal Display (LCD) screen. As another example, the visual peripheral output device can include a movable display or projecting system for providing a display of content on a surface remote from the system 2. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 4. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 can include any suitable hardware, software, or combination of hardware and software that is capable of coupling the system 2 to one or more networks and/or additional devices. The communications interface 10 can be arranged to operate with any suitable technique for controlling information signals using a desired set of communications protocols, services, or operating procedures. The communications interface 10 can include the appropriate physical connectors to connect with a corresponding communications medium, whether wired or wireless.

Vehicles of communication comprise a network. In various aspects, the network can include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules can communicate in accordance with a number of wired protocols. Examples of wired protocols can include Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 can include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 can include a wireless interface comprising one or more antennas, transmitters, receivers, transceivers, amplifiers, filters, control logic, and so forth.

In various aspects, the communications interface 10 can provide data communications functionality in accordance with a number of protocols. Examples of protocols can include various wireless local area network (WLAN) protocols, including the Institute of Electrical and Electronics Engineers (IEEE) 802.xx series of protocols, such as IEEE 802.11a/b/g/n/ac/ax/be, IEEE 802.16, IEEE 802.20, and so forth. Other examples of wireless protocols can include various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, the Wi-Fi series of protocols including Wi-Fi Legacy, Wi-Fi 1/2/3/4/5/6/6E, and so forth. Further examples of wireless protocols can include wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols can include near-field communication techniques and protocols, such as electro-magnetic induction (EMI) techniques. An example of EMI techniques can include passive or active radio-frequency identification (RFID) protocols and devices. Other suitable protocols can include Ultra-Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 can include any machine-readable or computer-readable media capable of storing data, including both volatile/non-volatile memory and removable/non-removable memory. The memory subsystem 8 can include at least one non-volatile memory unit. The non-volatile memory unit is capable of storing one or more software programs. The software programs can contain, for example, applications, user data, device data, and/or configuration data, or combinations therefore, to name only a few. The software programs can contain instructions executable by the various components of the system 2.

In various aspects, the memory subsystem 8 can include any machine-readable or computer-readable media capable of storing data, including both volatile/non-volatile memory and removable/non-removable memory. For example, memory can include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferro-electric polymer memory), phase-change memory (e.g., ovonic memory), ferroelectric memory, silicon-oxide-ni-tride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 can contain an instruction set, in the form of a file for executing various methods, such as methods for lift-to-find augmented reality guidance, as described herein. The instruction set can be stored in any acceptable form of machine-readable instructions, including source code or various appropriate programming languages. Some examples of programming languages that can be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processor subsystem 4.

Figure 2:
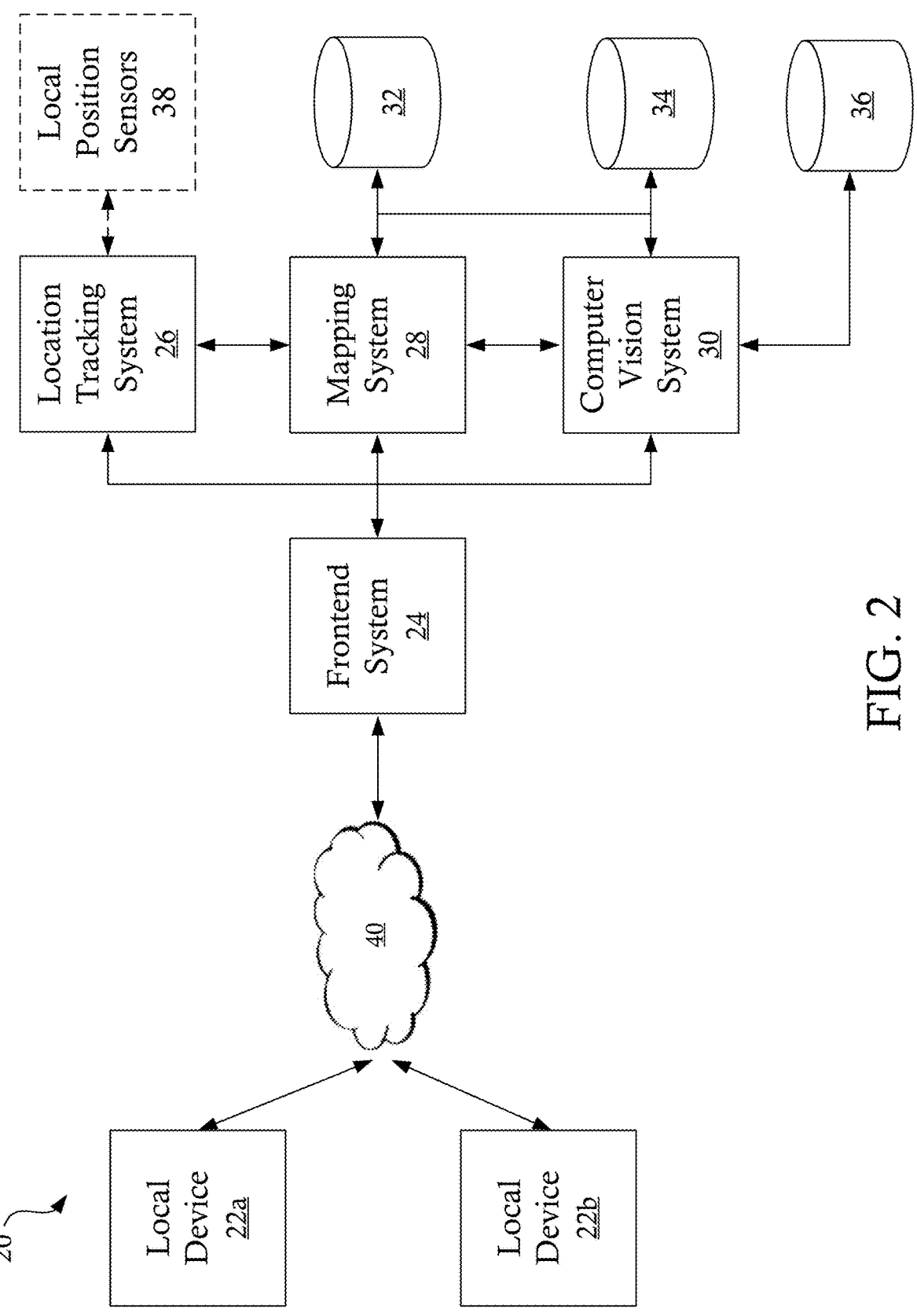
FIG. 2 illustrates a network environment configured to provide augmented reality guidance, in accordance with some embodiments.

FIG. 2 illustrates a network environment 20 configured to provide augmented reality guidance, in accordance with some embodiments. The network environment 20 includes a plurality of systems configured to communicate over one or more network channels, illustrated as network cloud 40. For example, in various embodiments, the network environment 20 can include, but is not limited to, one or more local devices 22a, 22b, a frontend system 24, a location tracking system 26, a mapping system 28, a computer vision system 30, a mapping database 32, an item database 34, a computer vision database 36, one or more local position sensors 38, and/or any other suitable system. Each of the illustrated devices and/or systems can include a computer system as described above in conjunction with FIG. 1. Although embodiments are illustrated with discrete systems, it will be appreciated that any of the illustrated systems can be combined into a single system. In addition, it will be appreciated that additional systems can be added to the illustrated network environment. For example, one or more of the illustrated systems can be duplicated and/or additional, unillustrated systems can be added.

In some embodiments, a local device 22a, 22b includes a form factor configured to be carried or moved throughout various locations. For example, a local device 22a, 22b can include, but is not limited to, a personal mobile device, a store-provided mobile device, a scanner device, and/or any other suitable device. In some embodiments, the local device 22a, 22b includes a display configured to provide a user interface and an image capture element configured to selectively obtain real-time image data at a location of the local device 22a, 22b. The local device 22a, 22b is in signal communication with a frontend system 24.

In some embodiments, the frontend system 24 is configured to provide generate a user interface for augmented reality guidance via the local device 22a, 22b. For example, the frontend system 24 can include a server or other frontend gateway configured to provide network resources and/or a network interface to requesting devices, such as a local device 22a, 22b. The frontend system 24 can include any suitable frontend gateway, such as a web server, local server, etc. The frontend system 24 can be configured to provide an augmented reality interface (e.g., data for generating an augmented reality interface) to a local device 22a, 22b. As discussed in greater detail below, in some embodiments, the augmented reality interface is configured to provide real-time guidance to a user of the local device 22a, 22b for transitioning the local device 22a, 22b to a position corresponding to an item of interest.

In some embodiments, a position of the local device 22a, 22b within a predetermined area and/or structure can be tracked by a location tracking system 26. The position of the local device 22a, 22b can be tracked using any suitable tracking system. For example, in some embodiments, the location of a local device 22a, 22b within a predetermined structure can be determined based on a magnetic signature, e.g., a unique magnetic field, generated by the local device 22a, 22b and/or systems installed within the predetermined structure, such as local position sensors 38. Magnetic signature tracking of a local device 22a, 22b within a predetermined structure can provide sub-meter location accuracy for the device.

For example, in some embodiments, one or more sensors installed within a predetermined locale are configured to detect a magnetic signature of a mobile device and determine a location of the magnetic signature within the predetermined locale. Additional and/or alternative location tracking, such as, for example, global navigation satellite systems (GNSS) such as global positioning satellite (GPS) systems, network-based tracking such as global systems for mobile communications (GSM) localization, client-side location tracking such as cell identification and signal strength tracking, subscriber identify module (SIM)-based tracking, Wi-Fi based tracking, hybrid positioning system tracking, and/or any other suitable tracking, can also be used to determined the position of a local device 22a, 22b.

In some embodiments, the frontend system 24, either alone or in conjunction with a local device 22a. 22b, is configured to provide an augment reality (AR) guidance interface to the local device 22a, 22b. The AR guidance interface is configured to provide guidance, such as visual and/or auditory guidance, to a user of the local device 22a, 22b to navigate the local device 22a, 22b to a destination within the predetermined locale. The destination can include any suitable position within the predetermined locale, such as, for example, a position corresponding to an item, department, and/or other portion of the predetermined locale.

In some embodiments, a mapping system 28 is configured to correlate a current position of the local device 22a, 22b to a digital representation of the predetermined locale. For example, in some embodiments, the mapping system 28 is configured to generate a digital representation, such as a digital map, of a predetermined location, such as a local retail location, local warehouse location, etc. When the position of a local device 22a, 22b is determined within the predetermined locale, a digital representation, such as an indicator or icon, is placed on the digital map of the predetermined locale in a position corresponding to the physical position of the local device 22a, 22b within the predetermined location. The digital representation of the predetermined locale and the current position of the local device 22a, 22b can be displayed via a display integrated with the local device 22a, 22b, for example, through an interface generation processed provided by the frontend system 24. In some embodiments, the digital map of the predetermined locale is obtained from a mapping database 32.

In some embodiments, the local device 22a, 22b is configured to provide to augmented reality guidance for locating an item of interest within the predetermined locale. For example, in some embodiments, the mapping system 28 is configured to execute one or more mapping processes to determine a route from a current position of the local device 22a, 22b to the position of an item within the predetermined locale. The frontend system 24 is configured to provide an interface including the route information generated by the mapping system 28 to the local device 22a, 22b. In various embodiments, the route information includes visual and/or auditory cues for navigating from the current position of the local device 22a, 22b to the position of the item.

In some embodiments, when a local device 22a, 22b is in proximity to the item of interest, an AR guidance interface including real-time image data is generated. For example, to continue to the example embodiment from above, after a user follows the directional guidance provided via the local device 22a, 22b to a relative position of an item within the predetermined locale, the user may still need to discern the exact position of the item on a display, such as a shelf or rack. In order to assist a user in locating the item, when the local device 22a, 22b is determined to be within a predetermined distance of the item, for example via the location tracking system 26, the local device 22a, 22b automatically activates an image capture element, such as a camera, formed integrally with the local device 22a, 22b. Image data obtained by the image capture element, such as video or still images, is processed to determine an exact position of the local device 22a, 22b relative to an item and provide guidance to a user to find the precise position of the item. For example, directional indicators and/or item highlights can be provided to direct a user to the exact position of an item within the predetermined locale.

In various embodiments, the system or components thereof can comprise or include various modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multi-threading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the examples herein.

Figure 4:
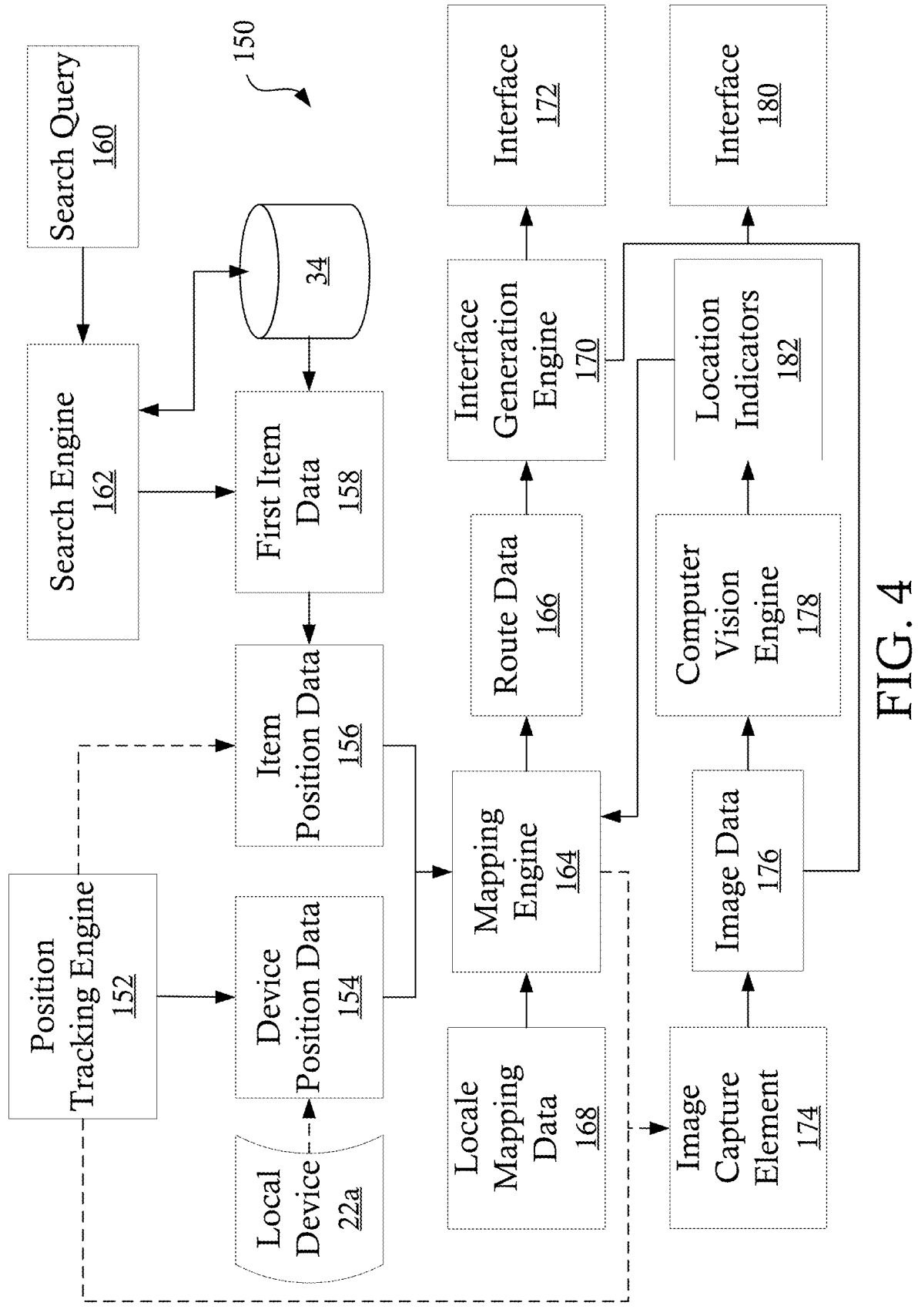
FIG. 4 is a process flow illustrating various steps of the method of lift-to-find augmented reality guidance, in accordance with some embodiments.
Figure 5:
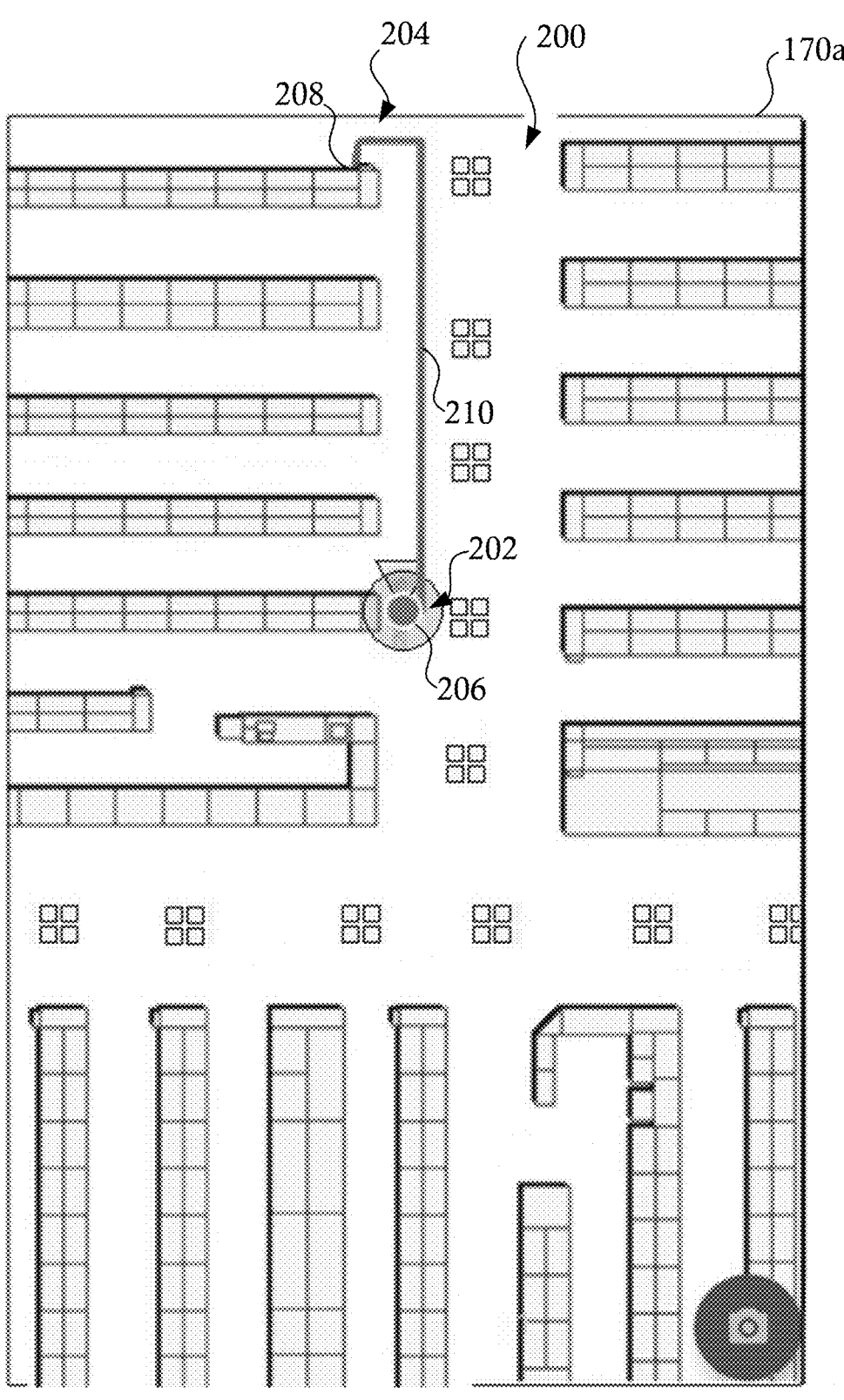
FIG. 5 illustrates a first interface representative of a retail environment having a local device positioned at a first position and a first item positioned at a second position, in accordance with some embodiments.

FIG. 3 is a flowchart illustrating a method 100 of lift-to-find augmented reality guidance, in accordance with some embodiments. FIG. 4 is a process flow 150 illustrating various steps of the method 100 of lift-to-find augmented reality guidance, in accordance with some embodiments. At step 102, a position of local device 22a within a predetermined locale is determined. For example, as illustrated in FIG. 5, a local device 22a can be positioned at a first position 202 within the predetermined locale 200. The predetermined locale 200 can include a structure and/or a delineated area. In some embodiments, the predetermined locale 200 includes a retail location, such as a brick-and-mortar retail store. The predetermined locale 200 can include an enclosed space (e.g., a structure) or an open space (e.g., an outdoor market or temporary area). The local device 22a can include any suitable device, such as, for example, a mobile phone, a tablet, a handheld computer, and/or any other mobile device.

In some embodiments, device position data 154 representative of a position of the local device 22a within the predetermined locale 200, for example at the first position 202, is generated by a position tracking engine 152. The position tracking engine 152 can be implemented by one or more of the local device 22a and/or a location tracking system 26. The device position data 154 can be generated using any suitable process. For example, in some embodiments, the local device 22a generates a unique magnetic signature that can be detected by one or more sensors within the predetermined locale 200. One or more parameters of the detected magnetic field can be processed to generate device position data 154 representative of a position of the local device 22a within the predetermined locale 200. For example, in some embodiments, one or more sensors 38 are positioned within the predetermined locale 200 such that a magnetic field of a local device 22a can be detected by one or more of the sensors at any position within the predetermined locale 200. In some embodiments, a site magnetic field is generated by one or more elements positioned within the predetermined locale 200 and the interaction between the site magnetic field and the unique magnetic signature of the local device 22a is detected. Use of magnetic positioning can provide sub-meter accuracy of a position of the local device 22a within the predetermined locale 200.

At step 104, a position of a first item 158 within the predetermined locale 200 is determined. For example, in some embodiments, a search query 160 is received from the local device 22a. The search query 160 can be received by a search engine 162. The search query 160 includes at least one search term related to an item contained within the predetermined locale. The search term can include any suitable identifier, such as a text input (e.g., name of an item), a numerical input, a universal product code (UPC), and/or any other identifier suitable to identify an item or class of items. The search query 160 can be generated by a user interacting with the local device 22a to enter the search term into an interface provided by the local device 22a. The interface can include one or more network pages provided and/or generated by the frontend system 24, an interface generated by a local application on the local device 22a, and/or any other suitable interface.

A first item 158 corresponding to the search query 160 can be identified within a catalog of items associated with the predetermined locale 200. For example, in embodiments including a retail location, the catalog of items includes items stocked at the retail location. The catalog of items can include all items stocked at the predetermined locale 200 and/or can be augmented by additional information, such as in-stock information, to shown only those items that are currently stocked on display elements within the predetermined locale 200.

In some embodiments, the search engine 162 generates a list of candidate items matching the search query 160. The list of candidate items can be presented through an interface of the local device 22a and a selection of one of the candidate items can be received. For example, in some embodiments, a list of candidate items can be generated by a search engine 162 in response to a search query 160 generated by the local device 22a. The list of candidate items are included in an interface presented to a user via the local device 22a. A user can operate the local device 22a to select one of the candidate items.

In some embodiments, item position data 156 representative of a position of the first item 158 within the predetermined locale 200 can be obtained from a database, such as an item database 34. For example, in some embodiments, item position data 156 identifies or corresponds to positional information provided by a store map, such as a store planogram, indicating a location of the first item 158 within the predetermined locale 200. In some embodiments, item position data 156 can be determined based on additional input, such as, for example, radio-frequency identification tags, image input from one or more cameras positioned around the predetermined locale 200, and/or using any other suitable input, to determine a stocked location of the first item 158. It will be appreciated that any suitable position data 156 can be correlated with an item to provide identification of a position of an item within the predetermined locale 200.

In some embodiments, the item position data 156 includes multiple position dimensions. For example, the item position data 156 can include aisle data, bay data, shelf data, bin data, etc. corresponding to a specific position within a predetermined locale 200. As another example, the item position data 156 can include a position on a first two-dimensional map or grid, such as a digital, two-dimensional representation of the predetermined locale 200, and a position on a second two-dimensional map or grid, such as a digital, two-dimensional representation of a particular aisle, bay, etc. within the predetermined locale 200. It will be appreciated that any suitable item position data 156 can be associated with an item such that the physical location of the item within the predetermined locale 200 can be determined and/or retrieved, for example, by a mapping engine 164.

As illustrated in FIG. 5, the first item 158 can be positioned at a second position 204 within the predetermined locale 200. The second position 204 corresponds to the expected and/or actual stocking location of the first item 158 within the predetermined locale 200. In the illustrated embodiment, the second position 204 is illustrated on a two-dimensional representation of the predetermined locale 200 illustrating a location in a grid (e.g., x-y coordinates) corresponding to a floor plan of the predetermined locale 200. Although not illustrated, it will be appreciated that the position data 156, and the corresponding second position 204, can include position data in a third dimension, e.g., a z coordinate, indicating the height of the first item 158 above the floor represented in the two-dimensional representation of FIG. 5.

At step 106, route data 166 from the position of the local device 22a, e.g., the first position 202 within the predetermined locale 200, to the position of the first item 158, e.g., the second position 204, is generated. For example, in some embodiments, a mapping engine 164 is configured to receive the device position data 154, the item position data 156, and mapping data 168 including a digital representation of the predetermined locale 200. The mapping data 168 can include data associated with structures, fixtures, and/or other obstacles within the predetermined locale 200 that prevent direct travel between a first point and a second point, such as, for example, between the current position of a local device 22a, e.g., the first position 202, and a position of the first item, e.g., the second position 204.

Route data 166 can be generated using any suitable routing and/or mapping process. For example, in some embodiments, multiple routes from the first position 202 to the second position 204 are determined and the shortest route is selected. In other embodiments, additional considerations, such as traffic flow directions, presentation of promotional products, and/or other factors can be incorporated into a route determination and can impact the selection of a route within the predetermined locale 200. It will be appreciated that any suitable routing algorithm and/or routing engine can be applied to generate route data 166, as is known in the art.

At step 108, a first interface 172 including the route data 166 is generated and presented via the local device 22a. In some embodiments, the first interface 172 can be generated by an interface generation engine 170. The interface generation engine 170 is configured to generate the first interface 172 using any suitable process, such as, for example, using a template interface and one or more insertable elements. The first interface 172 includes a visual representation of the route data 166. For example, as shown in FIG. 5, a first interface 172 can include a visual representation 206 of the of the route data 166 within the predetermined locale 200 from the first position 202 to the second position 204. Although embodiments are discussed herein including a visual representation, it will be appreciated that the first interface 172 can include audible representations (e.g., computer-generated speech or other computer-generated audio providing directional indications), tactile representations (e.g., tactile feedback providing directional indications), and/or any other suitable representation of the route data 166.

At step 110, a position of the local device 22a relative to the position of first item is tracked and the first interface 172 is updated to indicate a current location of the local device 22a. For example, the position of the local device 22a can be continuously and/or intermittently tracked by the position tracking engine 152 and the relative position of the local device 22a with respect to the first item 158 can be continuously and/or intermittently determined by the mapping engine 164. The position of the local device 22a can be determined using any suitable system, for example, as discussed above with respect to step 104. In some embodiments, the position of the local device 22a is tracked and/or updated at a predetermined interval, for example, once a second, once every five seconds, etc.

In some embodiments, an initial position of the local device 22a within the predetermined locale 200 is determined by a first positioning system and the position of the local device 22a is subsequently tracked by a second positioning system. For example, a magnetic positioning system can determine an initial position of the local device 22a, e.g., the first position 202, within the predetermined locale 200. After determining the initial position, the magnetic positioning system provides the location to the local device 22a, which monitors changes in position based on one or more sensors integrated with the local device 22a. For example, in some embodiments, the one or more sensors can include an accelerometer, a gyroscope, a magnetometer, etc. The input from one or more sensors can be combined to determine a change in position of the local device 22a. The current position of the local device 22a can be determined by applying the change in position, as determined by the one or more sensors, to the initial position, as determined by the magnetic positioning system. Although specific embodiments are discussed herein, it will be appreciated that the position of the local device 22a can be determined and/or tracked by any suitable positioning system or combination of positioning systems.

As the position of the local device 22a changes, the interface 172 is updated to illustrate the corresponding change. For example, in some embodiments, a position of a visual indicator corresponding to the local device 22a, such as the visual indicator 208 illustrated in FIG. 5, is adjusted on the interface to show the real-time position of the local device 22a. In some embodiments, the visual representation 206 of route data 166 is updated based on the change in position of the local device 22a, as is understood in the art.

When the position of the local device 22a is determined, at step 110, to be within a predetermined distance of the expected position of the first item, the method 100 transitions to step 112. At step 112, an image capture element 174 of the local device 22a is automatically activated to capture image data 176. Simultaneously, the local device 22a is transitioned to a second interface 180 including a real-time display of the image data 176. The image data 176 corresponds to a field of view of the image capture element 174 based on the current location and orientation of the local device 22a. The second interface 180 provides a real-time display such that a user interacting with the second interface 180 sees a real-time view of the portion of the predetermined locale 200 visible through the image capture element 174. Activation of the image capture element 174 can be triggered by a local application running on the local device 22a and/or by an activation message received from a remote location, such as a position tracking engine 152 and/or a mapping engine 164.

At step 114, a computer vision engine 178 determines whether the first item 158 is located within the field of view of the image capture element 174, e.g., whether a visual representation of the first item 158 is included in the image data 176. For example, in some embodiments, a known visual representation of the item of interest is obtained from a database, such as a computer vision database 36, and compared to the image data 176. The known visual representation can include one or more views and/or versions of a physical product to allow for matching of the item of interest within the image data 176 at various angles, orientations, etc. In some embodiments, a trained computer vision model, such as an image segmentation model, an object detection model, an edge detection model, a pattern detection model, an image classification model, and/or a feature matching model, can be applied to assist in and/or perform image recognition to determine if the item of interest appears within the image data 176.

Figure 6:
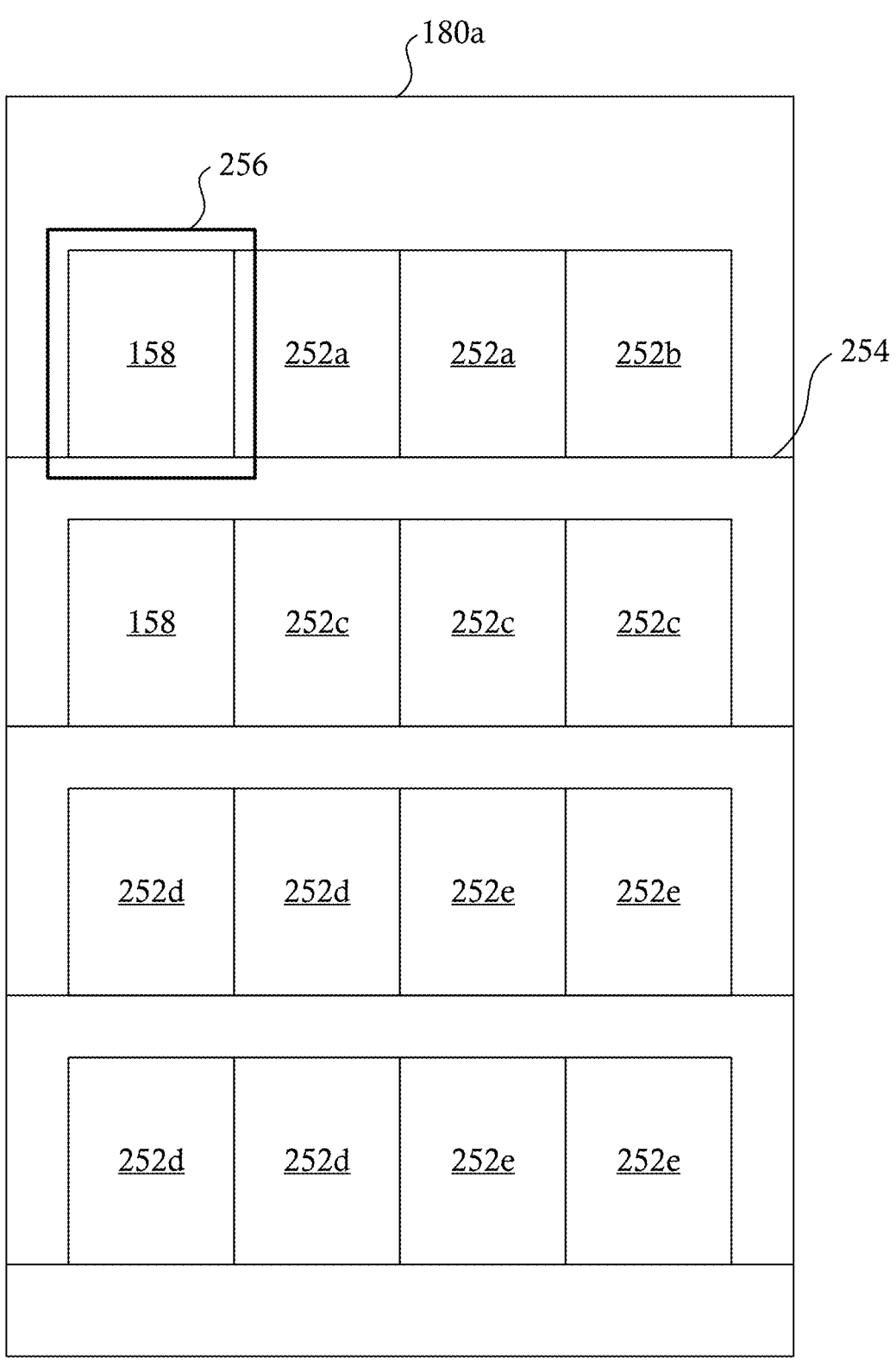
FIG. 6 illustrates a second interface including real-time image data and an item highlighter indicating the position of a first item within the real-time image data, in accordance with some embodiments.

If the first item 158 is identified in the image data 176, the method 100 proceeds to step 116. At step 116, the second interface 180 is updated to include an item highlight or accent to identify the position of the item of interest within the image data 176. FIG. 6 illustrates a representative interface 180a including illustrative image data showing a plurality of items 158, 252a-252e arranged on a shelving unit 254. An item highlighter 256 is positioned around an instance of the first item 158, directing a user of the local device 22a to an exact position of the first item 158. In the illustrated embodiment, the item highlighter 256 includes a box drawn around the first item 158, although it will be appreciated that any suitable highlighter can be used. For example, in various embodiments, item highlighter 256 can include, but is not limited to, any geometric or non-geometric shape encompassing the first item 158, one or more arrows or other directional markers indicating the first item 158, a modification or enhancement of the visual representation of the first item 158 in the interface 180a (e.g., a halo effect, change in color or saturation, etc.), and/or any other suitable visual indication of a position of the first item 158.

If the computer vision engine 178 determines that the first item 158 is not within the image data 176 at step 114, e.g., the first item 158 is not within the field of view of the image capture element 174, the method 100 proceeds to step 118.

At step 118, the image data 176 is processed to identify one or more location identifiers 182 within the image data 176. The location identifiers 182 can include elements having known locations within the predetermined locale 200. For example, in some embodiments, the location identifier 182 includes at least one additional item, such as a second item 252a, having a known location within the predetermined locale 200. As another example, in some embodiments, the location identifier 182 includes one or more fixed location markers positioned within the predetermined locale 200, such as signs, tags, etc. configured to be identifiable by the computer vision engine 178. It will be appreciated that any suitable combination of location identifiers 182 can be identified within the image data 176.

At step 120, a position of the identified one or more location identifiers 182 relative to the first item 158 is determined. For example, in some embodiments, a location identifier 182 includes a second item 252a. Position data for the second item 252a can be obtained, for example, from an item database 34. The position data 156 for the first item 158 and the second item 252a can be provided to the mapping engine 164 and a relative position of the second item 252a is determined with respect to the first item 158.

Figure 7:
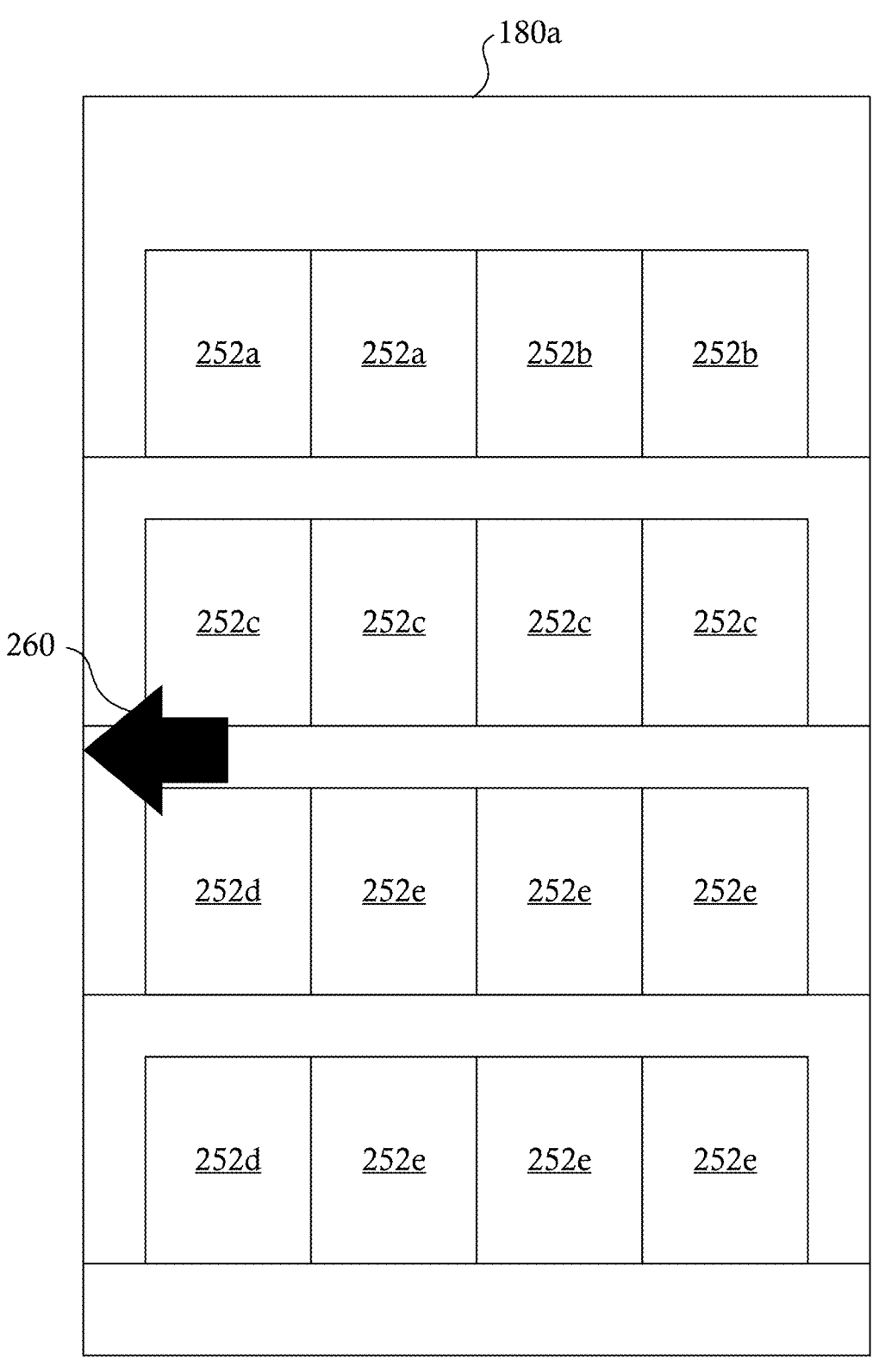
FIG. 7 illustrates a second interface including real-time image data and directional indicators indicating the position of a first item with respect to a field of view of the real-time image data, in accordance with some embodiments.

At step 122, the second interface 180 is updated to include directional indicators configured to indicate a position of the first item 158 relative to the location identifiers 182, e.g., relative to a second item 252a in the current field of view of the image data 176. For example, FIG. 7 illustrates a representative interface 180b including a plurality of items 252a-252e, where none of the plurality of items 252a-252e match a first item 158. The interface 180b includes a directional indicator 260 indicating that the first item 158 is positioned to the left of the current field of view. The relative position of the first item 158 with respect to the one or more location identifiers 182, and thus relative to the position of the current field of view, can include directional movement in one or more of six degrees of movement, e.g., up-down, forward-backward, left-right, roll, yaw, or pitch. For example, in some embodiments, the position of the first item 158 relative to the second item 252a can be represented by movement in one or more of three degrees, e.g., left-right, up-down, and front-back, although it will be appreciated that any suitable combination of movements can be utilized to represent a position of an identified location identifier relative to the first item As the local device 22a is moved, e.g., following the directional indicator 260, the method 100 continuously and/or incrementally returns to step 120 to determine if the first item 158 is located within the image data 176. After locating the first item 158 within the image data 176, the method 100 proceeds to step 122, as discussed above, and the method 100 completes. In some embodiments, the method 100 continuously and/or incrementally returns to step 112 to determine if the local device 22a is within a predetermined distance of the expected position of the first item 158. If the local device 22a is determined to be outside of the predetermined distance, the method 100 can return to step 114 and provide an interface 172 configured to guide a user of the local device 22a back to the area of the predetermined locale 200 including the first item 158.

Although various steps are depicted as discrete steps, it will be appreciated that one or more of steps 102-122 can be performed sequentially, simultaneously, and/or in a different order than depicted in FIG. 3. In addition, although interfaces 172, 180-180b are depicted as separate interfaces, it will be appreciated that the interfaces 172, 180-180b can include a continuous interface that is updated to include applicable interface elements as discussed herein. For example, in some embodiments, when the local device 22a is positioned within a predetermined distance of a position of the first item 158, the image capture element 174 is activated and a second interface 180 is generated. The second interface 180 provides a continuous feed of the image data 176 as the user moves the local device 22a around the predetermined locale 200. Prior to identifying the first item 158a, the second interface 180 includes visual directional indicators 260 to guide a user in locating the first item 158. Once the first item 158 is identified in the image data 176, the second interface 180 is adjusted to remove the directional indicators 260 and add an item highlighter 256 to identify the exact location of the first item 158 in the image data 176 as displayed on the local device 22a, corresponding to the exact position of the first item 158 within the predetermined locale 200.

Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:
   a non-transitory memory;
   a processor communicatively coupled to the non-transitory memory, wherein the processor is configured to read a set of instructions to:
   determine a first position of a local device within a predetermined locale;
   determine a second position of a first item within the predetermined locale;
   generate route data indicative of a route from the first position to the second position;
   track a real-time position of the local device;
   in response to the real-time position of the local device being within a predetermined distance of the second position, automatically and without user intervention, activate an image capture element of the local device;
   receive image data from the image capture element of the local device; determine whether the first item is within the image data;
   in response to determining the first item is not within the image data, generate a direction indicator indicating a position of the first item relative to a field of view of the image data; and
   in response to determining the first item is within the image data, generate an item highlighter indicating a position of the first item within the image data, the item highlighter replacing the direction indicator.

2. The system of claim 1, wherein the direction indicator is generated by:
   identifying one or more location identifiers within the image data;
   determining a relative location of the first item with respect to the one or more location identifiers; and
   generating the direction indicators to indicate the relative position of the first item.

3. The system of claim 2, wherein the one or more location identifiers include a second item.

4. The system of claim 2, wherein the one or more location identifiers are each associated with a known location within the predetermined locale.

5. The system of claim 1, wherein the processor is configured to read the set of instructions to:

generate a first interface including a virtual representation of at least a portion of the predetermined locale and at least one route indicator corresponding to the route from the first position to the second position; and generate a second interface including the image data, wherein the second interface includes one of the item highlighter or the direction indicator.

6. The system of claim 5, wherein the one of the item highlighter or the direction indicator includes a visual element superimposed over the image data.

7. The system of claim 1, wherein the first position of the local device is determined by one or more sensors positioned within the predetermined locale.

8. The system of claim 7, wherein the real-time position of the local device is tracked based, at least in part, on data generated by at least one sensor integrated with the local device.

9. A computer-implemented method, comprising:

determining, by a position tracking engine, a first position of a local device within a predetermined locale;

obtaining a second position of a first item within the predetermined locale;

generating, by a mapping engine, route data indicative of a route from the first position to the second position;

tracking, by the position tracking engine, a real-time position of the local device;

in response to the real-time position of the local device being within a predetermined distance of the second position, automatically and without user intervention, activating an image capture element of the local device;

receiving, by a computer vision engine, image data from the image capture element of the local device;

determining, by the computer vision engine, whether the first item is within the image data;

in response to determining the first item is not within the image data, generating, by the interface generation engine, a direction indicator indicating a position of the first item relative to a field of view of the image data; and in response to determining the first item is within the image data, generating, by an interface generation engine, an item highlighter indicating a position of the first item within the image data, the item highlighter replacing the direction indicator.

10. The computer-implemented method of claim 9, wherein the direction indicator is generated by:

identifying one or more location identifiers within the image data;

determining a relative location of the first item with respect to the one or more location identifiers; and generating the direction indicators to indicate the relative position of the first item.

11. The computer-implemented method of claim 10, wherein the one or more location identifiers include a second item.

12. The computer-implemented method of claim 10, wherein the one or more location identifiers are each associated with a known location within the predetermined locale.

13. The computer-implemented method of claim 9, comprising:

generating a first interface including a virtual representation of at least a portion of the predetermined locale and at least one route indicator corresponding to the route from the first position to the second position; and

generating a second interface including the image data, wherein the second interface includes one of the item highlighter or the direction indicator.

14. The computer-implemented method of claim 13, wherein the one of the item highlighter or the direction indicator include a visual element superimposed over the image data.

15. The computer-implemented method of claim 9, wherein the first position of the local device is determined by one or more sensors positioned within the predetermined locale.

16. The computer-implemented method of claim 15, wherein the real-time position of the local device is tracked based, at least in part, on data generated by at least one sensor integrated with the local device.

17. A non-transitory computer-readable medium having instructions stored thereon that, when executed by a processor, cause a device to perform operations comprising:

determining, by a position tracking engine, a first position of a local device within a predetermined locale;

obtaining a second position of a first item within the predetermined locale;

generating, by a mapping engine, route data indicative of a route from the first position to the second position;

tracking, by the position tracking engine, a real-time position of the local device;

in response to the real-time position of the local device being within a predetermined distance of the second position, automatically and without user intervention, activating an image capture element of the local device;

receiving, by a computer vision engine, image data from the image capture element of the local device;

determining, by the computer vision engine, whether the first item is within the image data;

in response to determining the first item is not within the image data, generating, by the interface generation engine, a direction indicator indicating a position of the first item relative to a field of view of the image data, the direction indicator expressing relative movement in one or more of six degrees of movement including left-right, up-down, front-back, roll, yaw, or pitch using one or more location identifiers comprising fixed location markers and/or known items with known locations; and in response to determining the first item is within the image data, generating, by an interface generation engine, an item highlighter indicating a position of the first item within the image data, the item highlighter comprising a dynamic visual overlay that changes color or saturation based on user proximity, the item highlighter replacing the direction indicator.

18. The non-transitory computer-readable medium of claim 17, wherein the direction indicator is generated by:

identifying one or more location identifiers within the image data;

determining a relative location of the first item with respect to the one or more location identifiers; and generating the direction indicators to indicate the relative position of the first item.

19. The non-transitory computer-readable medium of claim 18, wherein the one or more location identifiers include a second item associated with a known location within the predetermined locale.

20. The non-transitory computer-readable medium of claim 17, wherein the instructions cause the device to perform operations comprising:

generating a first interface including a virtual representation of at least a portion of the predetermined locale and at least one route indicator corresponding to the route from the first position to the second position; and generating a second interface including the image data, wherein the second interface includes one of the item highlighter or the direction indicator.

\* \* \* \* \*